United States Patent [19]

Lawless

[11] 4,104,775

[45] Aug. 8, 1978

[54] EXTRACTION TOOL

[76] Inventor: Earl E. Lawless, P.O. Box 472, Georgetown, Calif. 95634

[21] Appl. No.: 731,161

[22] Filed: Oct. 12, 1976

[51] Int. Cl.$^2$ .............................................. B23P 19/04

[52] U.S. Cl. .......................................... 29/265; 29/280

[58] Field of Search ......................... 29/280, 263, 265; 81/72; 269/48.1; 279/2 R; 82/44

[56] References Cited

U.S. PATENT DOCUMENTS

| | | | |
|---|---|---|---|
| 2,226,078 | 12/1940 | Spahn | 29/280 |
| 2,601,419 | 6/1952 | Spahn | 81/72 |
| 2,899,741 | 8/1959 | Dunkerley | 29/263 |
| 3,031,995 | 5/1962 | Taylor | 269/48.1 |
| 3,986,383 | 10/1976 | Petteys | 29/263 |

FOREIGN PATENT DOCUMENTS

| | | | |
|---|---|---|---|
| 249,154 | 10/1962 | Australia | 29/263 |

*Primary Examiner*—James L. Jones, Jr.
*Attorney, Agent, or Firm*—Townsend and Townsend

[57] ABSTRACT

An extraction tool, for aiding in the removal of a tubular piece that has been fitted or otherwise bonded in a fitting or second tubular piece, comprising a pair of cone-shaped expander heads threadably mounted on one end on a longitudinally extending rod in axial alignment therewith, at least two expanding jaw segments shaped to surround and bear down upon the expander heads, a finger nut attached to the other end of the rod for rotating same, and a handle. The outer faces of the jaw segments form parts of a generally cylindrical surface having teeth adapted to provide a gripping relation with an interior of a tubular piece when forced thereagainst. The threaded engagement between the rod and expander heads is such that rotating the rod will effect relative movement of the expander heads in an axial and opposite direction. Such movement of the expander heads produces uniform radial expansion of the jaw segments from the rod and into gripping relation with the interior of the tubular piece in which the extraction tool has been inserted. Once solidly gripped, heat may be applied to the fitting exterior, if necessary, and the tubular piece pulled free. Alternate embodiments include a reamer fitted to the rod and various types of gripping teeth on the outer surfaces of the jaw segments for improved gripping relation between the extraction tool and interior surfaces of tubular pieces.

13 Claims, 5 Drawing Figures

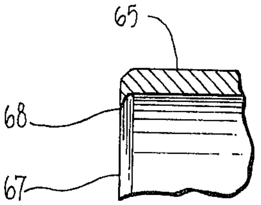
Fig. 3
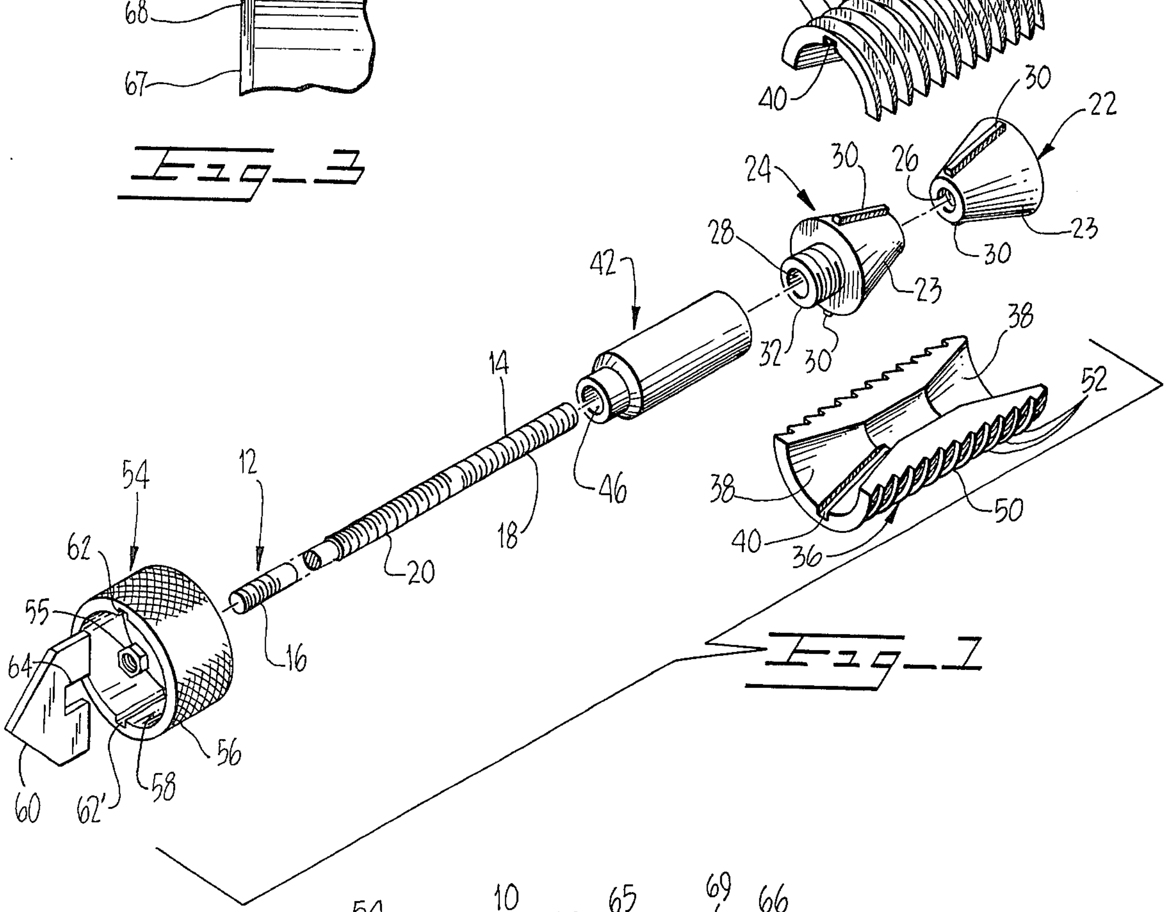
Fig. 1
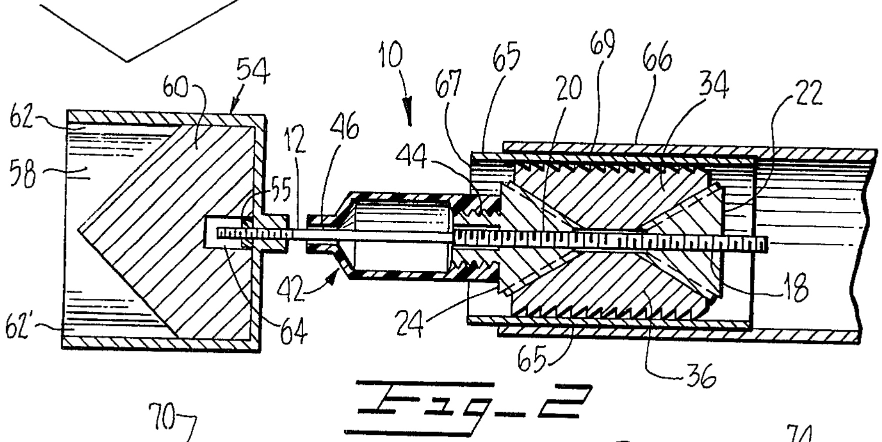
Fig. 2
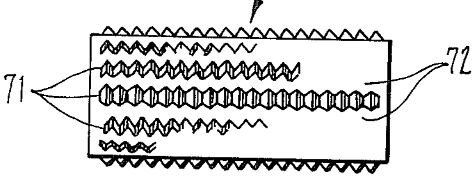
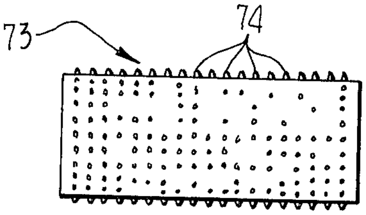
Fig. 4
Fig. 5

EXTRACTION TOOL

BACKGROUND OF THE INVENTION

This invention relates to tools for use in the removal of tubular inserts from fittings and, in particular, to tools for use in the removal of tubular inserts that have been previously bonded to a fitting by soldering or the like.

In many occupations, workmen are required to remove a tubular insert from a fitting in which at least a portion of the insert is snugly received. Frequently, the insert to be removed has been previously bonded to the fitting by the use of solder or a similar heat-sensitive bonding agent. Plumbers, for example, are frequently required to reroute various sections of the plumbing tubing which typically necessitates the physical separation of joints and fittings which have been previously soldered together to form a leak-proof, solid bond. In such cases, one piece of tubing is usually cut near the joint to be broken, heat is applied to melt or otherwise defeat the bond, and the inner tubular insert is extracted. This extraction process typically requires that the fitting or tube from which the insert is extracted be left in an undamaged condition.

A common extraction technique employed in the past proceeds by grasping a portion of the severed end of the tubing insert with the jaws of a pair of ordinary pliers and manually applying a pulling force in a direction away from the joint to be disengaged while applying heat to the joint. This technique suffers from several disadvantages. First, it is exceedingly difficult to maintain the purchase required to forcibly extract the insert over the length of time required to soften the bond with the applied heat. While this difficulty may be overcome by simply applying heat for an extensive period of time and then grasping the insert with the plier jaws and pulling, this solution is normally unsatisfactory since the application of excessive heat to the fitting to be retained permanently weakens the fitting. Moreover, where the severed tubing insert comprises a relatively soft material, e.g. copper or Teflon, sufficient purchase is virtually impossible to obtain since the plier jaws tend to chew or gouge the material. Further, if excessive gripping pressure is applied across the diameter of the severed tubing insert, the insert deforms both externally and internally of the fitting, which increases the resistance to separation and also tends to deform the fitting, rendering the latter useless. In addition, since ordinary pliers are fabricated from a relatively effective heat conductor, e.g. steel, the heat required to loosen the bond is quickly conducted via the fitting and severed tubing to the handle portion of the pliers, and the temperature of the handle portion is consequently raised to such a degree that the operator must release his grip or risk severe burns. While this difficulty may be alleviated by wearing a heat-insulative glove, or by wrapping the handle portion with an effective heat insulator, this solution impairs the manual dexterity of the operator.

Efforts have been made to design extraction tools to overcome the above-noted disadvantages encountered with the use of pliers, and for use in applications in which the insert cannot be gripped by the plier jaws, e.g. in the removal of bearing inserts. Representative examples of such tools are found in U.S. Pat. Nos. 736,991; 2,671,263; 3,052,973; 3,055,093; and 3,181,396. Such tools typically employ a generally cylindrical, radially expandable gripping member which is adapted to be introduced into the interior of the insert to be removed and a cooperating expander member for expanding the gripping member into surface engagement with the insert. In some known tools, the gripping member has a smooth outer surface; in others, a rough surface is provided, which may comprise a plurality of longitudinally spaced, circumferentially extending ridges, a helical screw thread or the like.

While such known tools have been found to be generally more effective than ordinary pliers, several difficulties have been encountered with the use of such devices. For example, the gripping elements of some devices expand radially in an uneven fashion so that only a limited portion of the available gripping surface of the gripping element is forced into surface engagement with the insert. As a result, the insert and fitting are typically deformed or scored when the insert is pulled from the fitting. This problem is amplified if the outer surface of each gripping element is provided with ridges or teeth since the ridges or teeth can tear through the tubing insert and damage the fitting, particularly if the insert and fitting comprise a relatively soft material. Moreover, some devices are constructed so that the gripping elements are allowed to rotate as they are expanded into surface contact with the interior of the insert. If the gripping element is provided with teeth, this rotational action can facilitate tearing through the insert by the teeth with resultant damage to the fitting. Additionally, many such devices are of all-metal construction so that the application of heat to loosen the bond between the insert and the fitting can cause the handle of the device to be raised to a temperature that can cause an operator to experience severe discomfort or a burn. Finally, a number of such extraction tools are of special construction making them inappropriate for portable, field use. Efforts to design an extraction tool devoid of the above limitations have not met with success to date.

SUMMARY OF THE INVENTION

The invention comprises a lightweight, small-sized extraction tool which is inexpensive to fabricate, simple to use, and highly effective in removing tubular inserts or otherwise separating tubular members in a wide variety of applications, particularly when the tube and fitting or tubular members are bonded together and defeating the bonding requires the application of heat.

The invention generally includes expandable jaw segments having an outer surface adapted to engage and grip one of the tubular members to be separated from a second tubular member. Expander heads are provided to cause the jaw segments to expand in a substantially uniform radial direction. The jaw segments engage the expander heads in such a way so as to inhibit relative rotation of the jaw segments while they are expanding outwardly into engaging relation with the tubular member.

The expander heads are a complementary pair of oppositely disposed cone-shaped members having threadably and axially aligned throughbores. The expander heads are threadably mounted on one end of a longitudinally extending rod and are adapted to engage a pair of expanding jaw segments shaped to surround and bear down upon the expander heads. The outer faces of the jaw segments form portions of a generally cylindrical surface and are provided with circular teeth extending in parallel planes adapted to grip the interior of a tubular piece when forced thereagainst. A handle is attached to one of the expander heads, through which the rod extends.

The threaded engagement between the rod and the two expander heads is such that rotating the rod will effect relative movement of the expander heads along the rod in axial and opposite directions. Such movement of the expander heads, together with their complementary cone shapes, will expand the jaw segments radially away from the rod, into gripping relation with an interior surface of the tubular piece, in a substantially uniform manner.

The expander heads are provided with protrusions which engage mating grooves in the expanding jaw segments. An operator, by firmly holding the handle in a non-rotating position, can rotate the rod to cause axial movement of the expander heads without concomitant rotational movement of the expander heads or jaw segments.

The handle is fabricated from a material that resists conduction of heat. Thus, heat applied to defeat a bond between the tubular piece to be removed and a fitting or second member will not be transferred to the hand of the operator holding the handle.

A number of advantages are achieved by the extraction tool of the present invention. First, holding the handle in a non-rotating position while rotating the rod to force the expanding jaw segments into gripping relation with the tubular piece, inhibits rotation of the tool; damage to the fitting, which could occur through a clawing action of the gripping teeth if the tool is allowed to rotate, is inhibited. Second, since movement of the expander heads places the entire jaw segment surfaces into gripping relation with the interior of the tubular piece to be extracted, relative to the rod and the expanded jaw segments, the possibility of piercing the tube and damaging the fitting is obviated. The gripping pressure exerted upon the interior of the tubular piece is equal by all gripping teeth. A firm grip is obtained on the tubular piece with no fear of damage to the fitting.

For a fuller understanding of the nature and advantages of the invention, reference should be had to the ensuing detailed description taken in conjunction with the accompanying drawings.

BRIEF DESCRIPTION OF THE DRAWINGS

FIG. 1 is an exploded perspective view illustrating a preferred embodiment of the invention;

FIG. 2 is a side sectional view of the preferred embodiment of FIG. 1 installed in an insert and illustrating operation of the invention;

FIG. 3 is a partial sectional view of an insert; and

FIGS. 4 and 5 are top plan views illustrating alternate embodiments of the gripping surface provided on the expander jaws of the invention.

DETAILED DESCRIPTION OF THE PREFERRED EMBODIMENTS

Turning now to the drawings, FIGS. 1 and 2 illustrate a first embodiment of the invention. As seen in these Figs., an extraction tool generally designated by reference numeral 10 includes rod 12 having threaded ends 14 and 16. End 14 is provided with threads 18 of left-hand direction while threads 20 are of right-hand direction. The diameter of that portion of rod 12 extending from threaded end 16 to commencement of threads 20 is smaller in diameter than that portion of the bolt containing threads 18 and 20; the reasons for this smaller diameter will become evident below.

Threadably mounted upon end 14 of rod 12 are a pair of conical-shaped expander heads 22 and 24, having axially aligned throughbores 26 and 28, respectively. As can be seen, the expander heads 22, 24 are mounted in facing relation. Throughbores 26 and 28 are threaded to cooperatively match threads 18 and 20 and to cause the expander heads to move in opposite directions, along the rod 12, when rod 12 is rotated in a given sense. Each expander head 22, 24 has a pair of longitudinally aligned protrusions 30 located on the outer conical surfaces 23 thereof. Expander head 24 additionally is provided with a cylindrically shaped, externally threaded extension 32, the outer surface of which is threaded.

As noted above, the diameter of that portion of rod 12 extending from threaded end 16 to commencement of threads 20 is somewhat smaller than the diameter of the remaining portion. The purpose for this reduced diameter is to allow expander head 24 to slide over threaded end 16 and onto rod 12 so that expander head 24 may be threaded onto the threads 20.

A pair of complementarily configured expander jaw segments 34 and 36 are provided, each having conical concave surfaces 38 formed and adapted to engage and bear upon the outer surface 23 of expander heads 22, 24. Each surface 38 of the expander jaw segments 34, 36 contains therein elongate slots 40 adapted to slidably receive the protrusions 30 of expander heads 22, 24.

A generally cylindrically shaped hollow handle member 42 is provided with interior threads 44 at one end thereof to allow the handle member to be tightly screwed into the threaded extension 32 of expander head 24. Throughbore 46 of the handle has a minimum inner diameter sufficiently great to accommodate insertion and rotation of rod 12 as shown without interference.

Expander jaw segments 34, 36 have outer faces 48 and 50 which form segments of a cylinder that encompasses expander heads 22, 24 when the device is assembled as shown. Faces 48, 50 are provided with gripping teeth 52 in the form of semi-circular ridges which circumferentially line each respective jaw segment. The function of teeth 52 will be made evident from the ensuing description of the operation of the invention.

Threaded upon end 16 of rod 12 is a cup-shaped finger nut 54 and a lock nut 55. Finger nut 54 functions to facilitate manual rotation of rod 12 during operation and to this end is provided with a knurled outer surface 56 or other equivalent means for enabling an operator to rotate the finger nut with a minimum of slippage. Finger nut 54 is further provided with a cup-like recess 58 within which an optional reamer blade 60 is located. Reamer 60 is frictionally received in a pair of slots 62, 62' formed in the inner wall of finger nut 54 and is provided with a notch 64 to provide clearance for nut 55. Reamer 60 enables the user to enlarge or otherwise clear an opening into which the extraction tool is to be inserted.

In use, extraction tool 10 is assembled in the following fashion. Expander head 22 is threaded onto threads 18 of rod 12 and expander head 24 is slid onto the rod over threaded end 16, and threaded onto threads 20. Expander heads 22, 24 are threaded on rod 12 so that they are oppositely disposed, as shown in FIGS. 1 and 2. Threaded end 16 is inserted into and through throughbore 46 of handle member 42 so that the handle member may be screwed onto threaded extension 32 of expander head 24. Finger nut 54 and lock nut 55 are then threaded onto end 16 of rod 12. Reamer blade 60 is then inserted into slots 62, 62' of finger nut 54.

Once assembled, tool 10 is used to separate two connected tubular members 65, 66 in the following fashion. First, it may be necessary to clear or otherwise enlarge opening 67 of insert 65 to facilitate insertion of tool 10 therein. For example, gas or water tubing is usually cut with a conventional pipe cutting tool of the type having a hook which passes beneath the pipe and forms a rest while the cutting chisel or disk is driven into the outer circumferential surface of the tubing, around which the cutting tool is then revolved. This type of cutter usually leaves a burr 68 (FIG. 3) which obstructs the opening 67 of insert 65. Removal of burr 68 is quickly and easily accomplished in the conventional manner, utilizing reamer 60.

With burr 68 removed, tool 10 may now be inserted through opening 67 and into insert 65. With reference to FIG. 2, jaw segments 34, 36 are manually held together about expander heads 22, 24 and inserted into tubular insert 65. It may be necessary to rotate rod 12 with finger nut 54 in a direction that causes the expander heads to separate, thereby allowing jaw segments 34, 36 to contract to a smaller overall diameter for the working end of tool 10. Once inserted, finger nut 54 is rotated in the proper direction to draw expander heads 22, 24 towards one another. At the same time, handle 42, which is secured to expander head 24, is firmly held against rotation. Due to the engagement of the elongate protrusions 30, located on the outer conical surfaces 23 of each expander head, with mating grooves 40, the entire jaw segment-expander head assembly is consequently held against rotation.

It should be noted that since expander heads 22, 24 engage threads 18, 20, respectively, rotation of rod 20 effects simultaneous movement of both expander heads 22, 24. This simultaneous movement of expander heads 22, 24 causes jaw segments 34, 36 to separate radially in a substantially even manner so that gripping teeth 52 of the jaw segments equally engage the inner wall of tubular insert 65.

As expander heads 22, 24 are drawn together by rotation of rod 12, their engagement with the angular surfaces 38 of jaw segments 34, 36 force the teeth 52 of jaw segments 34, 36 into gripping engagement with the interior wall of tubular insert 65 until firm gripping engagement with tubular insert 65 is obtained. In the event insert 65 is bonded to tubular member 66, as by solder 69, heat is applied to melt the solder and thereby defeat the bond. Thereafter, insert 65 is withdrawn from tubular member 66 by manually applying a pulling force to the left as viewed in FIG. 2. Once withdrawn, insert 65 may be removed from tool 10 by simply rotating rod 12 in the opposite direction to force expander heads 22, 24 apart until jaw segments 34, 36 can be released.

As discussed above, heat was applied to tube 66 to loosen or otherwise defeat bond (here, solder 69) which holds the two members 65, 66 together. For this purpose handle 42 is preferably fabricated from a material having a low coefficient of thermal conductivity. This insures that an operator can firmly grasp handle 42 directly to manipulate tool 10 without fear of being burned and need not apply a cumbersome insulative wrapping about handle 42 or use an asbestos glove or the like.

Illustrated in FIGS. 4 and 5 are alternate embodiments of gripping teeth located on the outer surfaces 48, 50 of jaw segments 34, 36. FIG. 4 illustrates a jaw segment 70 that is provided with gripping teeth rows 71 separated by flutes 72. Gripping teeth 71 are more suitable for establishing a firm gripping relation with tubular inserts fabricated from harder metals. Alternately, FIG. 5 shows a jaw segment 73 provided with gripping teeth 74 which are a plurality of small, sharp, raised protrusions. Gripping teeth 74 are more suitable for use in establishing a firm grip upon inserts comprising plastic, Teflon, soft metals, or the like, and minimize the possibility of piercing the insert and scoring the fitting in which the insert is held.

As will now be apparent, extraction tools fabricated in accordance with the teachings of the present invention are relatively inexpensive to manufacture, simple to assemble and manipulate, sufficiently small in size to conveniently carry in a tool box, and highly effective in removing tubular inserts in a wide variety of applications. Moreover, the substantially uniform radial displacement of the jaw segments 34, 36 afforded by simultaneous and equal movement of expander members 34, 36 insures that the gripping surfaces of the jaw segments uniformly and firmly engage a large area of the inner surface of the insert prior to removal. Thus, scoring and deformation of the insert and attendant damage to the surrounding fitting are thereby obviated. In addition, scoring of the inner surfaces of the insert and the fitting is eliminated by the absence of rotation of the jaw segments during radial expansion which further insures preservation of the fitting during extraction of the insert. Further, the low thermal conductivity of the handle enables the tool to be comfortably manipulated, even while heating the members to be decoupled, without danger to the user.

Finally, providing the extraction tool of the present invention with a reamer that may be utilized to clear and enlarge the opening into which the tool is to be inserted, obtains an added labor saving advantage. After the tubing is cut, the workman need only employ the extraction tool; the time and effort required for a separate search for a reamer to clear the opening is obviated.

While the above provides a full and complete disclosure of the preferred embodiments of the invention, various modifications, alternate constructions and equivalents may be employed without departing from the true spirit and scope of the invention. For example, a larger number of jaw segments than the two segments 34, 36 illustrated may be employed, if desired, with each such segment having at least one pair of longitudinally extending slots, and expander members may be provided with the requisite number of complementary protrusions 30.

Therefore the above description and illustrations should not be construed as limiting the scope of the invention, which is defined by the appended claims.

What is claimed is:

1. An extraction tool for use in separating a pair of generally tubular members, said tool comprising:

expandable jaw means for engaging one of said tubular members, said expandable jaw means including an outer surface adapted to grip an interior surface of one of said tubular members; and expanding means coupled to said expandable jaw means for providing substantially uniform radial expansion of said jaw means, said expanding means including a pair of oppositely disposed complementary expander heads and means connected to the expander heads for effecting relative and equal movement of each of said expander heads in opposing directions, said expanding means further including means for inhibiting relative rotation of said expandable jaw means during expansion thereof, said inhibiting means including at least one protrusion located on a surface of each of said expander heads and at least one longitudinal groove formed in said expandable jaw means adapted to slidably receive said protrusions.

2. The extraction tool of claim 1, including a handle member removably connected to one of said expander heads.

3. The extraction tool of claim 1, wherein said expandable jaw means includes at least a pair of jaw segments slidably mounted on said expander heads, said outer surfaces of said jaw segments forming parts of a cylindrical surface.

4. The extraction tool of claim 3, wherein said outer surfaces of said jaw segments include circular teeth extending in parallel planes.

5. An extraction tool for use in separating a pair of generally tubular members, said tool comprising:

a pair of oppositely disposed expander heads, said expander heads being provided with axially aligned throughbores;

a rod having a first end received within said throughbore of each expander head;

means coupling said rod to said expander heads for enabling relative axial movement of said expander heads in equal and opposite directions; and a plurality of expanding jaw segments slidably mounted upon said expander heads, said jaw segments having expander head engaging surfaces to effect substantially uniform radial displacement of each said jaw segment in response to axial movement of said expander heads;

each of said expanding jaw segments including a longitudinal groove in said expander head engaging surface, each of said expander heads including a protrusion adapted to be slidably received by each of said longitudinal grooves so that relative rotation between said expander heads and said jaw segments is inhibited.

6. The extraction tool of claim 5, including a handle having low thermal conductivity connected to one of said expander heads, said handle being provided with a bore through which said rod loosely extends.

7. The extraction tool of claim 6, wherein said expander heads are conical in shape.

8. The extraction tool of claim 7, including a finger nut attached to the other end of said rod and having an outer knurled surface.

9. The extraction tool of claim 8, wherein said finger nut is provided with a concave portion disposed with respect to said rod to face away from said rod; and a reamer member disposed in said concave portion.

10. An extraction tool for use in separating a pair of generally tubular members, said tool comprising:

expandable jaw means for engaging one of said tubular members, said expandable jaw means including an outer surface adapted to grip an interior surface of one of said tubular members; and expanding means coupled to said expandable jaw means for providing substantially uniform radial expansion of said jaw means, said expanding means including a pair of oppositely disposed complementary expander heads and means connected to the expander heads for effecting relative and equal movement of each of said expander heads in opposing directions, said expanding means further including means for inhibiting relative rotation of said expandable jaw means during expansion thereof, said inhibiting means including at least one protrusion located on a surface of said expandable jaw means and at least one longitudinal groove formed in each of said expander heads adapted to slidably receive said protrusion.

11. The combination of claim 10 further including a handle member removably connected to one of said expander heads.

12. The combination of claim 10 wherein said expandable jaw means includes at least a pair of jaw segments slidably mounted on said expander heads, said outer surfaces of said jaw segments forming parts of a cylindrical surface.

13. The combination of claim 12 wherein said outer surfaces of said jaw segments include circular teeth extending in parallel planes.

* * * * *